G. C. MARTIN.
FRICTION CLUTCH.
APPLICATION FILED MAY 19, 1910.
1,019,267.
Patented Mar. 5, 1912.
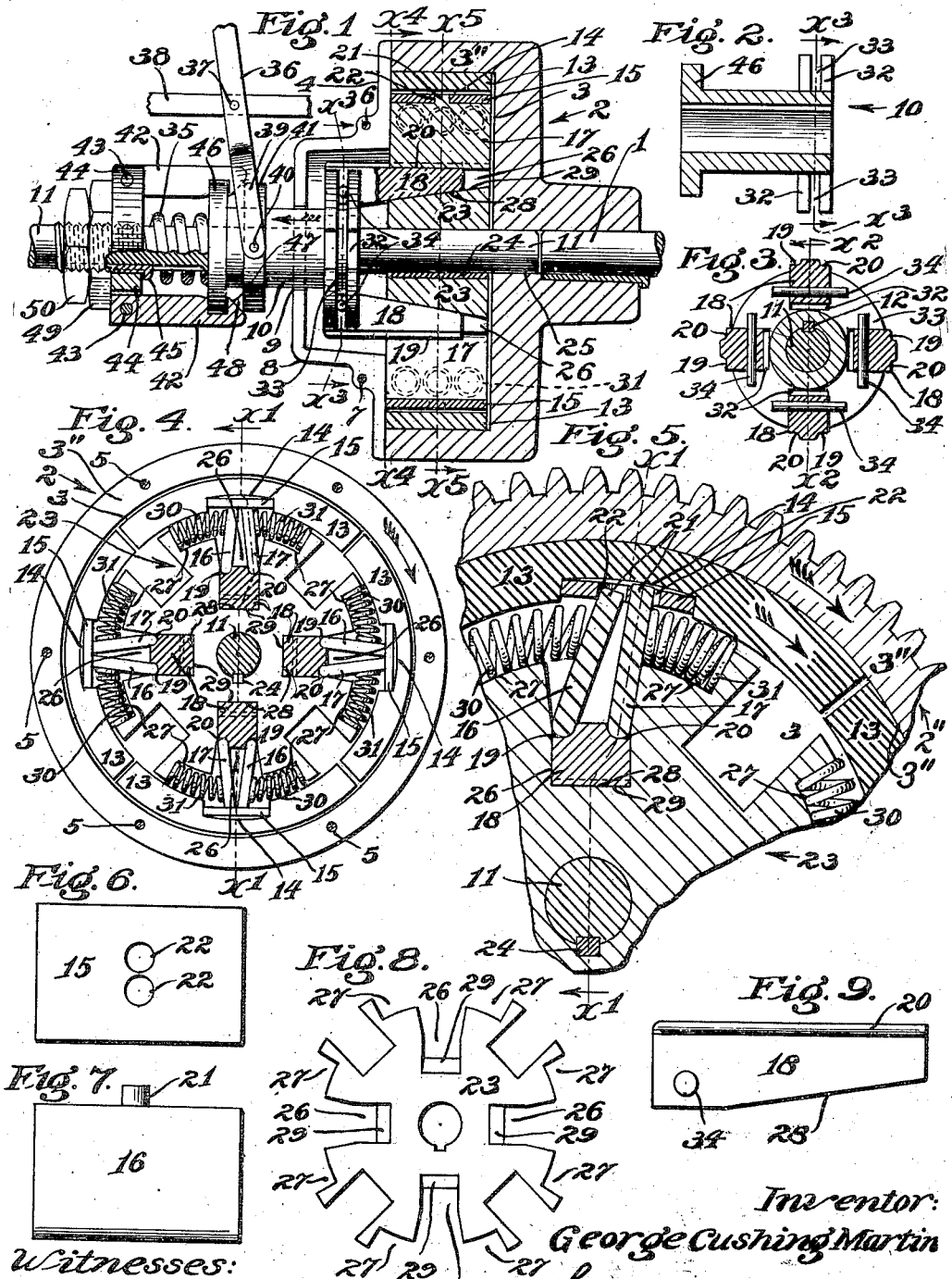
Witnesses:
G. H. Hiles.
L. Belle Rice.
Inventor:
George Cushing Martin
by James R. Townsend
his Atty.

UNITED STATES PATENT OFFICE.

GEORGE CUSHING MARTIN, OF LOS ANGELES, CALIFORNIA.

FRICTION-CLUTCH.

1,019,267.

Specification of Letters Patent.

Patented Mar. 5, 1912.

Application filed May 19, 1910. Serial No. 562,297.

*To all whom it may concern:*

Be it known that I, GEORGE CUSHING MARTIN, a citizen of the United States, residing at Los Angeles, in the county of Los Angeles and State of California, have invented a new and useful Friction-Clutch, of which the following is a specification.

An object of this invention is to provide a friction clutch that will be superior to clutches heretofore known in that it is positive in its action and is instantaneous in its release so that the wear of the parts is greatly reduced and the life of the clutch greatly increased.

An advantage gained by this invention is freedom from spinning of the driven parts after the clutch has been operated for release.

Another object of the invention is to provide a clutch which automatically adjusts itself to take up wear; also to provide for latching the clutch in its operable position.

Another object is to provide for releasing the latch upon the release of the clutch.

Other objects and advantages may appear from the subjoined detail description.

This invention is capable of embodiment in various forms to provide a yielding clutch which will sustain a definite strain to transmit rotary motion in reverse directions, and is also capable of embodiment in said various forms to provide a device that will operate as a yielding ratchet clutch to transmit rotary motion in one direction only; the second kind of clutch being produced by simply omitting certain elements that are present in the first-mentioned kind.

The clutch is made operable by a resilient toggle-joint device that forces shoes carried by one rotary member into engagement with a circular face of a second rotary member; and the resiliency of the toggle-joint device may be provided by employing a bowed resilient toggle bar or by an interposed spring. The latter form will be illustrated.

The accompanying drawings illustrate the invention.

Figure 1 is a view of a clutch embodying this invention as applied to connect two shafts, portions of which are shown. Some of the parts are shown in elevation and others are shown in longitudinal section on irregular line indicated by $x^1$—$x^1$, Figs. 4 and 5. One of the wedges is shown intact, and another is shown partly in section. Fig. 2 is a longitudinal section of the sleeve on line indicated by $x^2$—$x^2$, Fig. 3. Fig. 3 is a cross section of the sleeve and wedges from line $x^3$, Figs. 1 and 2. Fig. 4 is a sectional elevation on line $x^4$, Fig. 1. Fig. 5 is a fragmentary section on line indicated by $x^5$—$x^5$, Fig. 1; the clutch head being provided with a gear in this view. Fig. 6 is a plan of one of the toggle springs. Fig. 7 is an elevation of one of the toggle bars. Fig. 8 is an end view of the clutch core. Fig. 9 is a side elevation of one of the wedges and its pin.

Arrows on the section lines in the several views indicate the direction of sight.

The driving shaft 1 may be of any usual form and a fly-wheel 2 forming one clutch member may be provided with a clutch chamber 3 to receive operative parts of the clutch and serves the purpose of the clutch-head or case, and is keyed or otherwise fastened to the driving-shaft 1. The clutch chamber is cylindrical and coaxial with the shaft 1 and the head 2 is provided with a split cap 4 suitably fastened as by screws 5 to the head 2, and formed of two halves secured together by nut and bolts 6, 7, and provided with an extension 8 to house movable parts of the clutch. The housing 8 is provided with a central opening 9 to receive a sleeve 10 which is slidingly mounted on the driven shaft 11 by the feather 12 and rotates with said shaft.

Inside the chamber 3 of the clutch head 2 are a plurality of segmental shoes 13, the outer curved faces of which are concentric with the peripheral wall 3'' of the chamber 3. Said shoes are centrally recessed on their inner faces and in the recesses 14 thereof are seated leaf-like toggle-springs 15, which are supported on the floors of the recesses and normally extend along the chords of the recesses 14 which are segmental in form so that the springs may be bowed outwardly by pressure from within at their mid-length. Toggle bars 16 and 17 are detachably arranged in pairs and converge outwardly to engage the springs 15 centrally, the inner ends of said toggle bars being engaged by wedges 18, each of which is provided with two seats 19 and 20, to pivotally hold the inner ends of the toggle bars 16, 17, the outer ends of which are provided with means in the form of lugs 21 to engage in holes 22 in the toggle springs 15 for the purpose of holding the toggle springs 15 and shoes 13 in true position with the toggle bars nearly in radial relation to the core 23 that is rotatable relative to the member 2 and that forms another member of the clutch and is fixed by a key 24 on the driven shaft 11 which projects beyond the core to form a supporting arbor in the bore 25 of the clutch-head 2. Said core is provided with wedge chambers 26 having extensions 27 and divergent floors 29. A wedge 18 and a pair of toggle-bars 16, 17, are contained in each of said chambers 26, and the inner faces 28 of the wedges 18 slide along the divergent floors or inner walls 29 of the chambers 26 to force the toggle-bars outward and to allow them to return under pressure of the toggle springs.

Resilient means in the form of one or more springs for each toggle-bar are arranged in the extensions 27; said springs being opposed to each other in pairs as indicated at 30 and 31, and tending to hold the opposed toggle-bars 16 and 17 of each pair oppositely aslant from radial position so that upon any rotation of either member in either direction when the floating shoes 13 are in engagement with the rim wall 3″ of the chamber 3, the clutching action may quickly occur by the moving of one or the other of the toggle-bars toward a radial position as will be understood by comparison between the toggle-bars shown in Fig. 4 and those shown in Fig. 5; the outer clutch members 2 and 2″ in each figure being represented as rotating clock-wise, and the member 23 being represented as still in Fig. 4 and as rotating clock-wise in Fig. 5. The toggle-bars 16 and 17 extend along the outside faces of the wedges 18 in the seats 19, 20, respectively, and the wedges slide along the toggle-bars and along the seats 29 of the core 23 to move the toggle-bars outwardly toward the shoe in order to force the shoe into frictional contact with the peripheral wall 3″ of the clutch chamber 3.

The wedges 18 are mounted in slots 32 that extend along the sleeve 10 which is provided with a circumferential groove 33 in which pins 34 extend from the wedges 18, whereby said wedges are held against endwise movement relative to the sleeve so that when the sleeve is shifted endwise along the driven shaft 11 the wedges 18 will be moved into the chamber 3 along between the oblique faces 29 of the core and the inner ends of the toggle-bars 16 and 17, thereby to force said toggle-bars outwardly and to consequently act upon the toggle-springs 15 to force the shoes 13 into contact with the peripheral wall of the chamber 3, so that said shoes will frictionally engage said wall and will move therewith, tending to bring one of each pair of toggle-bars into radial relation to the core.

The side walls of the chambers 26 adjacent the toggle-bars extend radially of the core so that when either of the toggle-bars of a pair is stopped by one of said side walls of its chamber, either right or left, according as the rotation is to the right or left, said toggle-bar is in radial position and has consequently exerted to the limit its expansive force upon the shoe, thereby forcing the shoe against the peripheral wall of the chamber 3 as shown in Figs. 1 and 5 so as to exert the maximum friction to which the device is adjusted. The toggle springs 15 are of such strength and can be brought under such tension that they will effect sufficient frictional engagement of the head and shoes to cause the shafts 1 and 11 to rotate together under a determined load and to allow slippage under an excessive load.

On a movement of the sleeve 10 from the clutch chamber 3 as indicated by the large arrow on the sleeve in Fig. 1, the wedges 18 are withdrawn relieving the outward pressure against the toggle-bars and permitting the returning springs 30, 31, to immediately force the toggle-bars away from the radial or clutching position, thus relieving all friction between the shoes 13 and the peripheral wall 3″ of the clutch-head 2. The toggle-bars 16 and 17 are usually arranged in pairs as shown in Fig. 4, aslant toward a radius of the core and the springs 30, 31, are of equal strength so that when the toggle-bars are free to yield to said springs they will be brought into the position shown in Fig. 4 where the angle between the toggle-bars is bisected by a radius of the core.

The sleeve-operating spring 35 tends to force the sleeve toward the clutch-head, thereby to insert the wedges as above stated, and the retracting lever 36 pivoted at 37 to a support 38 having bifurcations 39 pivoted by pivots 40 to a collar 41 that surrounds the sleeve 10 and allows the same to rotate freely, is provided to retract the sleeve and consequently the wedges. From the nature of the view only one furcation of the lever is shown. By operating lever 36 by foot or otherwise, the sleeve may be withdrawn against the force of spring 35 to release the clutch which is normally held in engagement by said spring 35.

Latches 42 pivoted by pivots 43 to a collar 44 that is fixed by feather 45 to rotate with the driven shaft 11 and is slidable thereon, are provided to engage an annular shoulder 46 of the sleeve 10 when the wedges are fully seated. Said latches are provided with beveled tips 47 that are in the path of the collar 41 when the latches are latched and said collar 41 is mounted in a way 48 on the sleeve that is longer than the collar so that there is sufficient play of the collar along the way to release the latches by reason of contact with the tips 47 before the collar 41 comes into contact with the shoulder 46 of the sleeve to force the sleeve against the pressure of the spring 35. An adjusting nut 49 is held by a set nut 50 on the shaft 11 to adjust the collar 44 toward and from the clutch-head, thus to regulate the tension of the spring 35 and the position of the latches 42.

In practice the clutch may be applied to connect any two separable rotating members and is normally held in commission by the spring 35 which forces the wedges 18 into the chamber 3, thus to force the resilient toggle means outward. By operation of the lever 36 the wedges are withdrawn against the pressure of the spring 35.

The resiliency of the toggle means may be greater or less in correspondence with the power to be transmitted and in any instance when the toggle is forced to exert its maximum pressure there is still a possible slip between the shoes and the member with which they engage so that the engine running at high speed may be connected with its load without the jerk or jar that would otherwise occur. Any number of shoes, within the judgment and purpose of the constructor may be used, each being provided with one or more of the toggle bars as desired. By providing two oppositely disposed toggle bars for each shoe the clutch works the same in either direction and by omitting the bars on one side the clutch operates as a ratchet clutch to catch in one direction only.

I claim:

1. A clutch comprising two relatively rotatable members, floating shoes between said members, resilient means operable by relative rotation of said members to force the shoes into frictional engagement with one of said members upon relative rotation of the members in one direction, means to normally hold said resilient means in operative position to force said shoes, and means to retract said forcing means to release the pressure of the shoes.

2. A clutch comprising two relatively rotatable members, floating shoes between said members, resilient means operable by relative rotation of said members to force the shoes into frictional engagement with one of said members upon relative rotation of the members in one direction, wedge means to normally hold said resilient means in operative position to force said shoes, and means to retract said wedge means to release the pressure of the shoes.

3. A clutch comprising two relatively rotatable members, a floating shoe adapted to frictionally engage one of said members, resilient toggle means between said shoe and the other member, said toggle means operable through relative rotation of said members to force the shoe toward the member with which it engages, means to force the toggle means into operating position, and means to retract said toggle forcing means.

4. A clutch comprising two relatively rotatable members, a floating shoe adapted to frictionally engage one of said members, resilient toggle means between said shoe and the other member, said toggle means being operable through relative rotation of said members to force the shoe toward the member with which it engages, wedge means to force the toggle means into operating position, and means to retract said wedge means.

5. A clutch comprising two relatively rotatable members, a floating shoe adapted to frictionally engage one of said members, resilient toggle means between said shoe and the other member, said toggle means being operable by relative rotation of said members to force the shoe toward the member with which it engages, a wedge to force the toggle means into operating position, a spring to move the wedge into toggle forcing position, and means to retract the wedge against the force of the spring.

6. A clutch comprising two relatively rotatable members, a floating shoe adapted to frictionally engage one of said members, resilient toggle means between said shoe and the other member, said toggle means being operable by relative rotation of said members in either direction to force the shoe toward the member with which it engages, a wedge to force the toggle means into operating position, a spring to move the wedge into toggle forcing position, and means to retract the wedge against the force of the spring.

7. A clutch comprising two relatively rotatable members, a floating shoe adapted to frictionally engage one of said members, oppositely disposed toggle-bars between said shoe and the other member, resilient means for applying the pressure of the toggle-bars yieldingly to the shoe to force the shoe toward the member with which it engages, means to normally force the toggle-bars into operating position, and means to retract the toggle-bar forcing means.

8. A clutch comprising two relatively rotatable members, floating shoes adapted to frictionally engage one of said members, resilient toggle means between said shoes and the other member, said toggle means being operable by relative rotation of said members in either direction to force the shoes toward the member with which they engage, wedges to force the toggle means into operating position, a slidable sleeve engaging the wedges, a spring to move the sleeve into toggle forcing position, a latch to normally hold the sleeve in toggle forcing position, a slidable collar to unlatch the latch and retract the sleeve from the toggle forcing position against the force of the spring and means to operate the collar.

9. A clutch comprising two relatively rotatable members, floating shoes adapted to frictionally engage one of said members, resilient toggle means between said shoes and the other member, said toggle means being operable by relative rotation of said members in either direction to force the shoes toward the member with which they engage, wedges to force the toggle means into operating position, a slidable sleeve engaging the wedges, a spring to move the sleeve into toggle forcing position, a latch to normally hold the sleeve in toggle forcing position, a slidable collar to unlatch the latch and retract the sleeve from the toggle forcing position against the force of the spring, means to control the tension of the spring and to adjust the latch, and means to operate the collar.

10. In a clutch the combination with two relatively rotatable members, of shoes to frictionally engage one of said members, resilient toggle means between said shoes and the other member, said toggle means being operable by relative rotation of said members in either direction to force the shoes toward the member with which they engage, wedges adapted to move simultaneously in direction parallel with and normal to the axis of rotation of said members, a slidable sleeve coaxial with the wedges and provided with slots to accommodate the ends of the wedges, and also provided with an annular groove, pins protruding from the wedges, engaging and radially shiftable within the annular groove in the sleeve and means to operate the sleeve.

11. In a clutch the combination with two relatively rotatable members, of floating shoes to frictionally engage one of said members, resilient toggle means between said shoes and the other member, said toggle means being operable by relative rotation of said members in either direction to force the shoes toward the member with which they engage, wedges adapted to move simultaneously in directions parallel with and normal to the axis of rotation of said members, a slidable sleeve coaxial with the wedges and provided with slots to accommodate the ends of the wedges, and also provided with an annular groove, pins protruding from the wedges, engaging and radially shiftable within the annular groove in the sleeve, a spring to move the sleeve into toggle-forcing position, a latch to normally hold the sleeve in toggle-forcing position, a slidable collar to unlatch the latch and retract the sleeve from the toggle-forcing position against the force of the spring, and means to operate the collar.

In testimony whereof, I have hereunto set my hand at Los Angeles, California, this 13th day of May, 1910.

GEO. CUSHING MARTIN.

In presence of—
  JAMES R. TOWNSEND,
  L. BELLE RICE.